United States Patent
Zhang et al.

(10) Patent No.: US 10,822,259 B2
(45) Date of Patent: Nov. 3, 2020

(54) METHOD FOR REMOVING HEXAVALENT CHROMIUM FROM WATER BODIES BY SODIUM OXALATE-MODIFIED ZERO-VALENT IRON

(71) Applicant: CENTRAL CHINA NORMAL UNIVERSITY, Hubei (CN)

(72) Inventors: Lizhi Zhang, Hubei (CN); Minzi Liao, Hubei (CN)

(73) Assignee: CENTRAL CHINA NORMAL UNIVERSITY, Hubei (CN)

( * ) Notice: Subject to any disclaimer, the term of this patent is extended or adjusted under 35 U.S.C. 154(b) by 0 days.

(21) Appl. No.: 16/535,267

(22) Filed: Aug. 8, 2019

(65) Prior Publication Data

US 2020/0048117 A1 Feb. 13, 2020

(30) Foreign Application Priority Data

Aug. 10, 2018 (CN) .......................... 2018 1 0909697

(51) Int. Cl.

| C02F 1/62 | (2006.01) |
|---|---|
| C02F 1/68 | (2006.01) |
| C02F 1/70 | (2006.01) |
| C02F 101/22 | (2006.01) |
| C02F 1/52 | (2006.01) |
| C02F 103/06 | (2006.01) |
| C02F 103/10 | (2006.01) |
| C02F 103/26 | (2006.01) |

(52) U.S. Cl.
CPC ............ *C02F 1/705* (2013.01); *C02F 1/5209* (2013.01); *C02F 1/62* (2013.01); *C02F 1/683* (2013.01); *C02F 2101/22* (2013.01); *C02F 2103/06* (2013.01); *C02F 2103/10* (2013.01); *C02F 2103/26* (2013.01)

(58) Field of Classification Search
None
See application file for complete search history.

(56) References Cited

FOREIGN PATENT DOCUMENTS

CN 101244864 B * 9/2010

OTHER PUBLICATIONS

Yexiang Tong et al—CN 101244864 A Machine Translation—2010 (Year: 2010).*

(Continued)

*Primary Examiner* — Bradley R Spies
(74) *Attorney, Agent, or Firm* — Tim Tingkang Xia, Esq.; Locke Lord LLP

(57) ABSTRACT

The present invention relates to a method for removing hexavalent chromium from water bodies by sodium oxalate-modified zero-valent iron. The method comprising the steps: soaking zero-valent iron in a sodium oxalate solution for a period of time; and washing and drying to obtain the sodium oxalate-modified zero-valent iron; and then treating water bodies with the sodium oxalate-modified zero-valent iron to remove the heavy metal pollutant hexavalent chromium from the water bodies. Compared with other chemical or physical methods for treating the zero-valent iron, the processing technology of the sodium oxalate-modified zero-valent iron is simple and easy to implement, and also has advantages of high efficiency, no pollution and environmental friendliness.

10 Claims, 9 Drawing Sheets

(56) References Cited

OTHER PUBLICATIONS

Zhang, Ruihua et al—"Arsenic and chromate removal from water by iron chips—Effects of anions" Front. Environ. Sci. Engin. China 2008 (Year: 2008).*

Keenan, Christina R. et al—"Ligand-Enhanced Reactive Oxidant Generation by Nanoparticulate Zero-Valent Iron and Oxygen"—Environ Schi Technol 2008 (Year: 2008).*

Liu, Junxi et al—"Aqueous Cr(VI) reduction by electrodeposited zero-valent iron at neutral pH: Acceleration by organic matters"—2008 (Year: 2008).*

Lin, Kun-Yi Andrew et al—"Enhanced reductive removal of bromate using Acid-Washed Zero-Valent iron in the presence of oxalic acid"—Chemical Engineering Journal, 2017 (Year: 2017).*

Fu, Fenglian et al—"Insights into environmental remediation of heavy metal and organic pollutants: Simultaneous removal of hexavalent chromium and dye from wastewater by zero-valent iron with ligand-enhanced reactivity"—Chemical Engineering Journal, 2013 (Year: 2013).*

Peng, Ruxin et al—"Oxalate-enhanced reactivity of nanoscale zero-valent iron under different conditions of O2, N2 or without aeration"—Chemical Engineering Journal, 2017 (Year: 2017).*

Wang, FeiFeng et al—"Effect of humic acid, oxalate and phosphate on Fenton-like oxidation of microcystin-LR by nanoscale zero-valent iron"—Separation and Purification Technology, 2016 (Year: 2016).*

Zhang, Xianlan et al—"Ligand-assisted degradation of carbon tetrachloride by microscale zero-valent iron"—Journal of Environmental Management, 2011 (Year: 2011).*

* cited by examiner

METHOD FOR REMOVING HEXAVALENT CHROMIUM FROM WATER BODIES BY SODIUM OXALATE-MODIFIED ZERO-VALENT IRON

CROSS-REFERENCE TO RELATED APPLICATION

This application claims priority to Chinese Patent Application No. 201810909697.2, filed Aug. 10, 2018 in the State Intellectual Property Office of P.R. China, which is hereby incorporated herein in its entirety by reference.

TECHNICAL FIELD

The present invention belongs to the technical field of water pollution control, particularly relates to a remediation method for heavy metal hexavalent chromium pollution in water bodies, and is suitable for treating the hexavalent chromium heavy metal pollution in industries, agriculture, mining industry and other fields.

BACKGROUND

With rapid development of the industries, the heavy metal pollution on the earth surface and in groundwater is becoming more and more serious. Events of the heavy metal pollution in the water bodies have been reported in most countries in the world and situation of the heavy metal pollution in China is particularly serious. For this reason, the "13th Five-Year Ecological Environmental Protection Plan" explicitly required to increase prevention and control of the heavy metal pollution. Unlike organic pollutants, heavy metals cannot be biodegraded and are easily enriched in organisms and cause harm to the organisms. Long-term exposure to toxic or carcinogenic the heavy metal polluted water bodies can cause various diseases and even cancers, leading to death. For example, chromium poisoning can lead to kidney failure, lung cancers, skin cancers, etc. Remediation of the heavy metal pollution in water is related to human body health, has attracted extensive attention from researchers and government departments and has been the focus of research in the field of environmental remediation.

Compared with other heavy metal pollution remediation technologies, a zero-valent iron technology has characteristics of low cost, environmental friendliness, application to the remediation of various heavy metals, etc. and has received more and more attention in the field of the remediation of the heavy metal polluted water bodies. After more than 20 years of basic research and application development, the zero-valent iron technology shows excellent effects of treating heavy metal ions (such as nickel (Ni), copper (Cu), chromium (Cr), mercury (Hg), uranium (U), arsenic (As), etc.) in certain water bodies, but still faces challenges in wide applications. For example, a zero-valent iron has a problem of low activity, which is manifested by low electron transfer efficiency and slow dissolution of ferrous ions. A reason for this problem is that during preparation, storage or use of the zero-valent iron, a layer of iron oxide/hydroxide shell is formed on the surface of the zero-valent iron to form a typical core-shell structure. The presence of the shell affects mass transfer of electrons in the system so as to reduce the efficiency of the zero-valent iron in removing pollutants. In order to increase the activity of the zero-valent iron, researchers have developed a variety of improved strategies to eliminate negative effects of the shell. For example, nano-zero-valent iron is prepared instead of micro-zero-valent iron for removing the pollutants, the nano-zero-valent iron shell is relatively thin, and the nano-zero-valent iron has relatively high reducing ability and reaction rate, and can effectively remove the heavy metal pollutants; and methods such as acid pickling, hydrogen pretreatment, ultrasonic treatment, etc. remove the shell part on the surface of the zero-valent iron, so that the zero-valent iron is directly exposed to the water bodies, thereby improving the efficiency of the zero-valent iron in removing the pollutants. Although these methods can improve the efficiency of the zero-valent iron in removing the heavy metals to a certain extent, these methods cannot fundamentally improve electron selectivity of the zero-valent iron: a ratio of the number of the electrons transferred by the zero-valent iron to the heavy metal ions to the total number of the electrons consumed by the reaction. Studies have shown that the electrons of the zero-valent iron are transferred from an iron core to the shell surface and react with the heavy metal ions, water molecules (or protons) and dissolved oxygen on the oxide shell surface. The priority of these reactions is closely related to surface functional groups of the oxide shell. Therefore, changing the zero-valent iron surface groups is one of effective ways to improve the electron selectivity of the zero-valent iron and improve ability of the zero-valent iron in removing the heavy metals.

SUMMARY

In view of the low activity of the zero-valent iron in reduction and removal of the hexavalent chromium, the present invention provides a simple-to-operate and non-polluting method for improving the ability of the sodium oxalate-modified zero-valent iron in the reduction and removal of the hexavalent chromium. The method solves the problem that the reducing ability of the zero-valent iron is poor due to existence of the surface oxide layer of the zero-valent iron, and has advantages of high efficiency, environmental friendliness and no secondary pollution for removing a water body pollutant of the hexavalent chromium.

A technical solution adopted by the present invention to solve the above-mentioned problem is as follows:

A method for removing hexavalent chromium from water bodies by sodium oxalate-modified zero-valent iron is as follows: soaking zero-valent iron in a sodium oxalate solution for a period of time; and washing and drying to obtain the sodium oxalate-modified zero-valent iron; and then treating water bodies with the sodium oxalate-modified zero-valent iron to remove the heavy metal pollutant hexavalent chromium from the water bodies.

In accordance with the above solution, the sodium oxalate solution has a concentration of 0.05-0.25 mol/L, preferably 0.1-0.2 mol/L.

In accordance with the above solution, the soaking time is between 0.5 and 2.0 h, preferably 1-2 h.

By optimizing the concentration and treatment time of the sodium oxalate solution, the activity of removing the hexavalent chromium from the water bodies by the modified zero-valent iron can be further improved. If the treatment time is too short or the concentration of the sodium oxalate is too low, hydroxyl groups on the surface of the zero-valent iron substituted by oxalate are limited; if the treatment time is too long or the concentration of the sodium oxalate is too high, excessive oxalates adhere to the surface of the zero-valent iron, active sites capable of reacting on the surface of the zero-valent iron are reduced, and the hexavalent chromium capable of adhering to the surface of the zero-valent iron becomes less due to steric hindrance, which is not conducive to the activity of removing the hexavalent chromium from the water bodies by the modified zero-valent iron.

In accordance with the above solution, the zero-valent iron is micron-sized zero-valent iron, including but not limited to micron-sized industrial zero-valent iron or micron-sized commercial zero-valent iron.

In accordance with the above solution, the drying is vacuum drying, drying under an inert atmosphere or freeze drying.

In accordance with the above solution, the hexavalent chromium in the water bodies has a concentration of between 0.1 and 100 mg/L.

In accordance with the above solution, the use amount of the sodium oxalate-modified zero-valent iron is 1 g/L-10 g/L.

In accordance with the above solution, shaker shaking or mechanical stirring is performed during treating water bodies with the sodium oxalate-modified zero-valent iron to remove the heavy metal pollutant hexavalent chromium from the water bodies.

Technical principles of the present invention are as follows:

The surface of the zero-valent iron is covered by an iron oxide layer, and the electrons are transferred from the iron core to the shell surface and react with the heavy metal ions, water molecules (or protons) and dissolved oxygen on the oxide shell surface. The priority of these reactions is closely related to the surface functional groups of the oxide shell. The oxalate contains two carboxyl groups and has a strong heavy metal complexation effect. The sodium oxalate is used to modify the zero-valent iron, the hydroxyl functional groups on the surface of the micron-sized zero-valent iron are partially substituted by the oxalate, the sodium oxalate-modified zero-valent iron with partial hydroxyls substituted by the oxalate is obtained, thus the zero-valent oxide shell surface forms different coordination modes, and a bridging function significantly enhances the binding ability of the sodium oxalate-modified zero-valent iron with the hexavalent chromium, enhances the ability to bind the heavy metals, reduces the ability to bind the water molecules, enhances the electron selectivity of the zero-valent iron, and enhances the ability in reducing and removing the hexavalent chromium.

The advantages of the method provided by present invention are as follows:

1. For the first time, the sodium oxalate is used to modify the zero-valent iron. The sodium oxalate-modified zero-valent iron has the relatively high ability to reduce the hexavalent chromium, solves a problem of low activity of the zero-valent iron in removing the hexavalent chromium from the water bodies at present, and is expected to be widely applied in environment pollution control. Compared with other chemical or physical methods for treating the zero-valent iron, the processing technology of the sodium oxalate-modified zero-valent iron is simple and easy to implement, and also has advantages of high efficiency, no pollution and environmental friendliness.

2. In the provided method for removing the hexavalent chromium from the water bodies by the sodium oxalate-modified zero-valent iron, recycling of the zero-valent iron is achieved and cycle performance is good.

3. The sodium oxalate has a simple structure and high content in nature, widely presents in the environment, is cheap and easy to obtain, and environmentally friendly and does not cause secondary pollution.

DETAILED DESCRIPTION

The present invention is described in detail by the following specific examples and the described specific examples are only intended to illustrate the invention and not to limit the invention.

Example 1 Effect of Sodium Oxalate Modified Zero-Valent Iron on Treating Hexavalent Chromium in Polluted Water Bodies 4 g of zero-valent iron is weighed, the weighed zero-valent iron is soaked in a 0.2 mol/L sodium oxalate solution for 1 h, filtering and washing are conducted, and the treated zero-valent iron is dried under the protection of inert gas.

Figure 1:
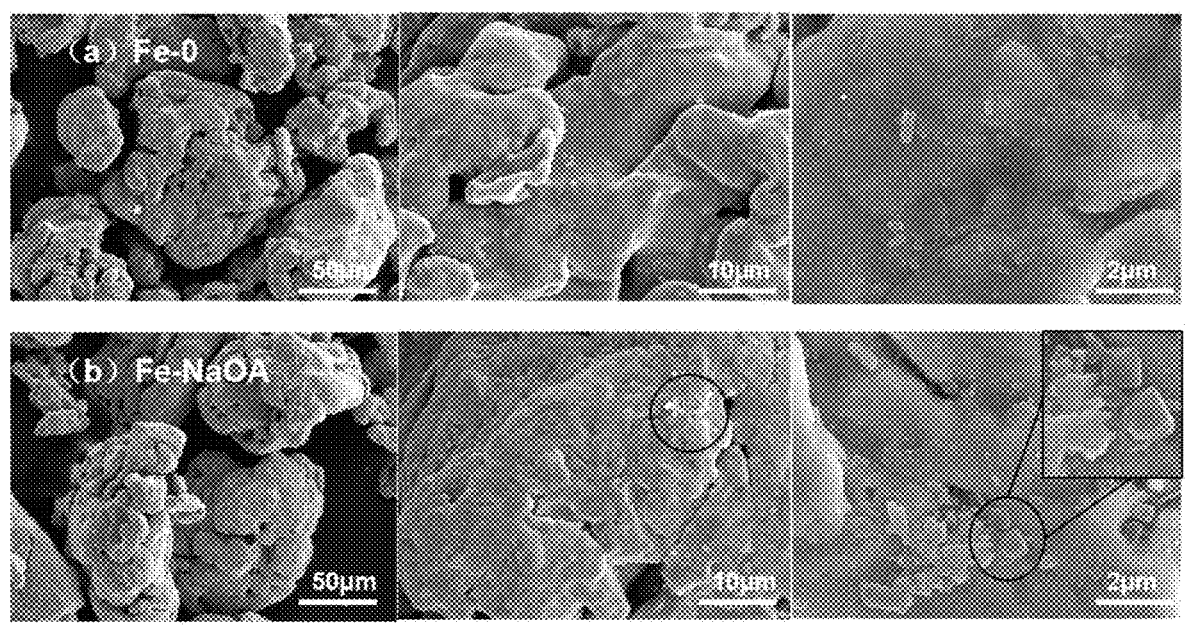
FIG. 1 is scanning electron micrographs of samples before and after sodium oxalate modification of zero-valent iron in the method of the present invention; wherein scanning electron micrographs of the zero-valent iron (Fe—O) in the upper three figures; and scanning electron micrographs of the sodium oxalate-modified zero-valent iron (Fe-NaOA) in the lower three figures.
Figure 2:
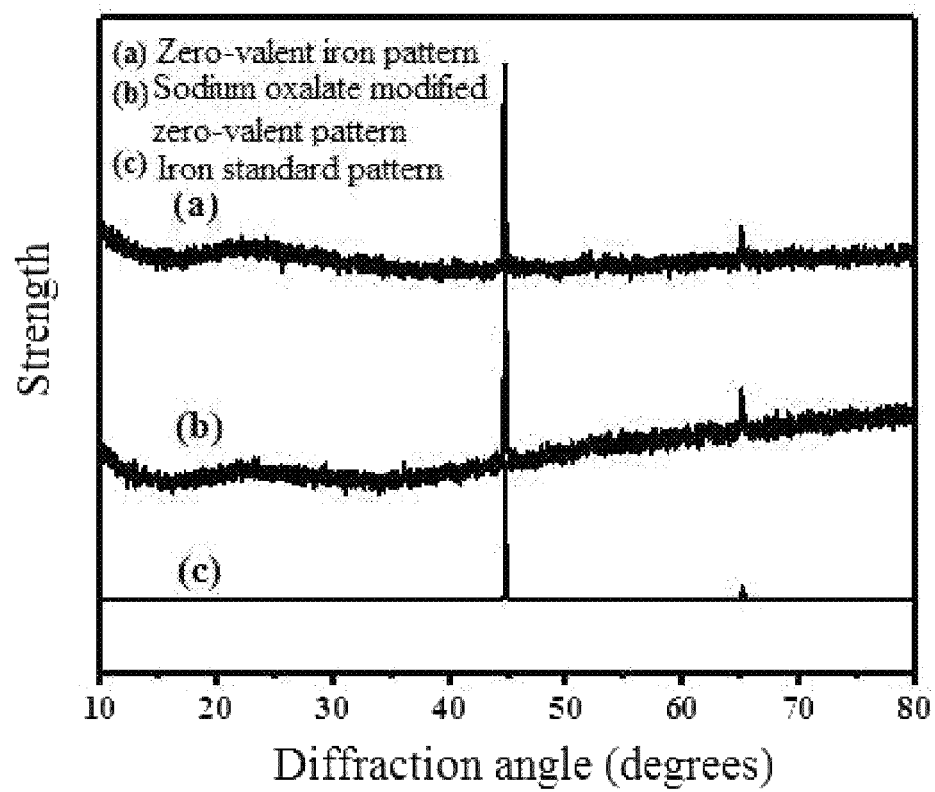
FIG. 2 is X-ray crystal diffraction patterns of samples before and after sodium oxalate modification of zero-valent iron in the method of the present invention.
Figure 3:
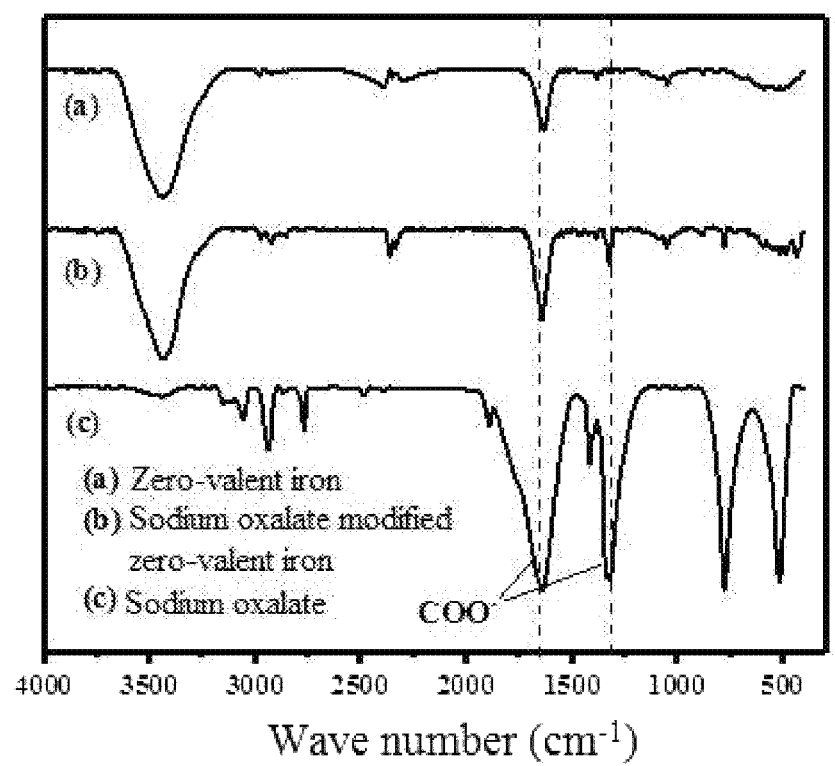
FIG. 3 is infrared spectrograms of samples before and after sodium oxalate modification of zero-valent iron in the method of the present invention.
Figure 4:
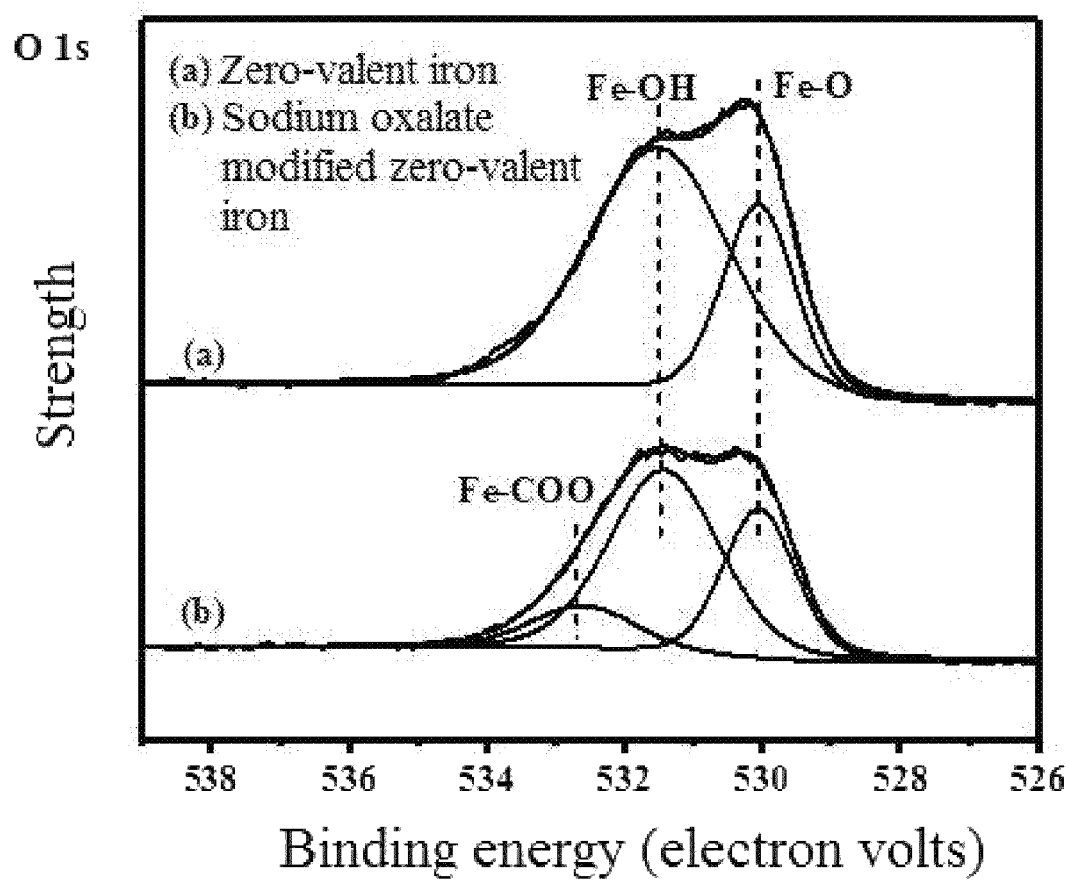
FIG. 4 is an X-ray photoelectron spectroscopy of surface oxygen of zero-valent iron before and after sodium oxalate modification of the zero-valent iron in the method of the present invention.

The scanning electron microscopes (SEM) of the zero-valent iron and sodium oxalate-modified zero-valent iron samples used in the method of the present invention (the used zero-valent iron and sodium oxalate-modified zero-valent iron are the same as those in the example 2) are shown in FIG. 1. Results show that compared with the untreated zero-valent iron, the surface shell layer of the sodium oxalate-modified zero-valent iron is cracked and some fine crystal particles are produced, indicating that the sodium oxalate reacts with the surface shell layer of the zero-valent iron, the oxide shell on the surface of the zero-valent iron is destroyed may due to the fact that the hydroxyl groups on the surface of the zero-valent iron are replaced by the oxalate, and the crystal particles may be a small amount of iron oxalate or iron oxide produced by the reaction. The sample X-ray diffraction (XRD) test results show that characteristic peaks of two zero-valent iron diffraction patterns (see FIG. 2) coincide with the peaks of a zero-valent iron standard diffraction pattern, indicating that an inner core crystal structure of the sodium oxalate-modified zero-valent iron is not changed. The sample infrared spectrograms show (see FIG. 3) that compared with the untreated zero-valent iron, the surface of the sodium oxalate-modified zero-valent iron shows characteristic peaks of carboxylate (1633 cm$^{-1}$: vas(C=O); 1323 cm$^{-1}$: vs(C=O)), and compared with the characteristic peaks of the carboxylate of the sodium oxalate (1639 cm$^{-1}$: vas(C=O); 1327 cm$^{-1}$: vs(C=O)), the characteristic peaks of the carboxylate on the surface of the sodium oxalate-modified zero-valent iron have a certain degree of red shift, which indicates that the oxalate can be stably present on the surface of the zero-valent iron by the soaking method and a new coordination form is formed on the surface of the zero-valent iron. The sample surface O 1s high-resolution X-ray photoelectron spectroscopy (XPS) results show (see FIG. 4): in the high-resolution O 1s XPS, binding energies at positions of 530.0 eV, 531.4 eV and 532.6 eV are respectively attributed to iron-bonded lattice oxygen (Fe—O), iron-bonded surface hydroxyl group (Fe—OH) and iron-bonded surface carboxylate (Fe—COO); and by peak separation of the spectroscopy, compared with the untreated zero-valent iron, it is found that peak shapes of the O 1s energy spectroscopy of the sodium oxalate-modified zero-valent iron are obviously shifted to high binding energy places, and a peak area ratio of the Fe—O is almost unchanged, a peak area ratio of the Fe—OH is decreased and a peak area ratio of the Fe—COO is increased, indicating that the surface hydroxyl groups of the sodium oxalate-modified zero-valent iron are indeed partially substituted by the oxalate.

Figure 5:
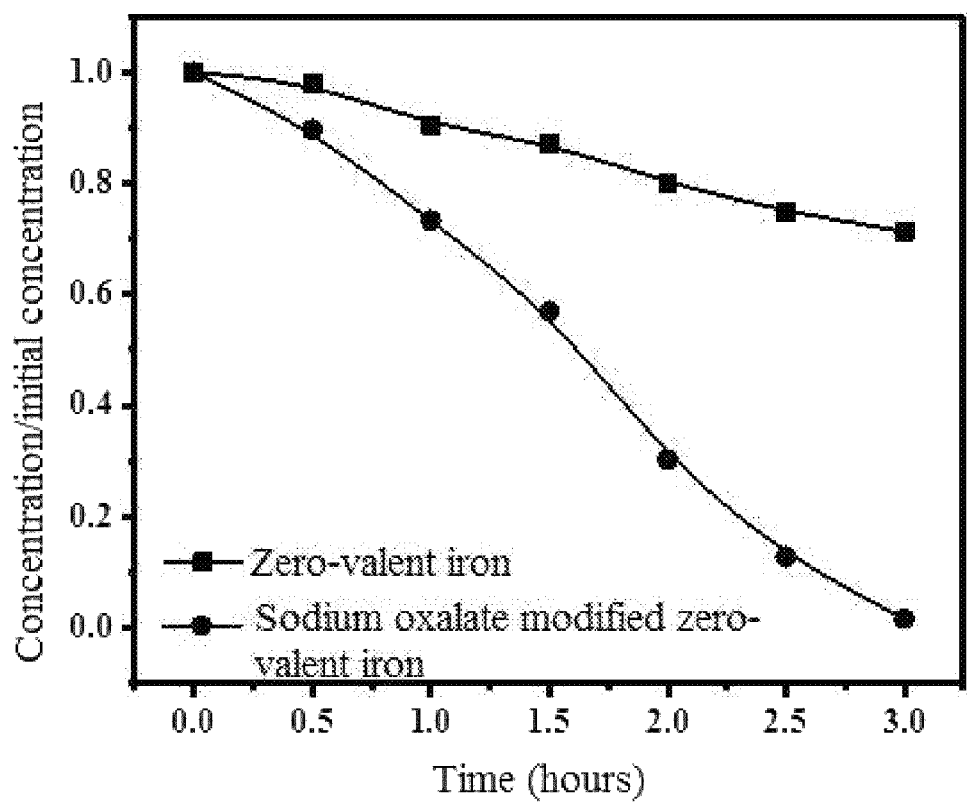
FIG. 5 is a diagram showing the effects of sodium oxalate-modified zero-valent iron in treating hexavalent chromium in polluted water bodies in the method of the present invention.

Aiming at the remediation of the heavy metal hexavalent chromium polluted water source, 50 mL of a 2 mg/L hexavalent chromium aqueous solution is used as simulated wastewater, 0.25 g of the sodium oxalate-modified zero-valent iron is added to the hexavalent chromium aqueous solution, the hexavalent chromium aqueous solution containing the sodium oxalate-modified zero-valent iron is put in a shaker at constant temperature of 25° C. and a rotating speed of 200 rpm/min, timing sampling is conducted, and a spectrophotometry is used to measure the hexavalent chromium concentration. At the same time, the untreated zero-valent iron is used as a control test and the results are shown in FIG. 5. As shown in the FIG. 5, after 3 h of the reaction, a removal rate of the hexavalent chromium in a system containing the sodium oxalate-modified zero-valent iron reaches 100%, while the removal rate of the hexavalent chromium in a system containing the unmodified zero-valent iron is 25%.

Figure 6:
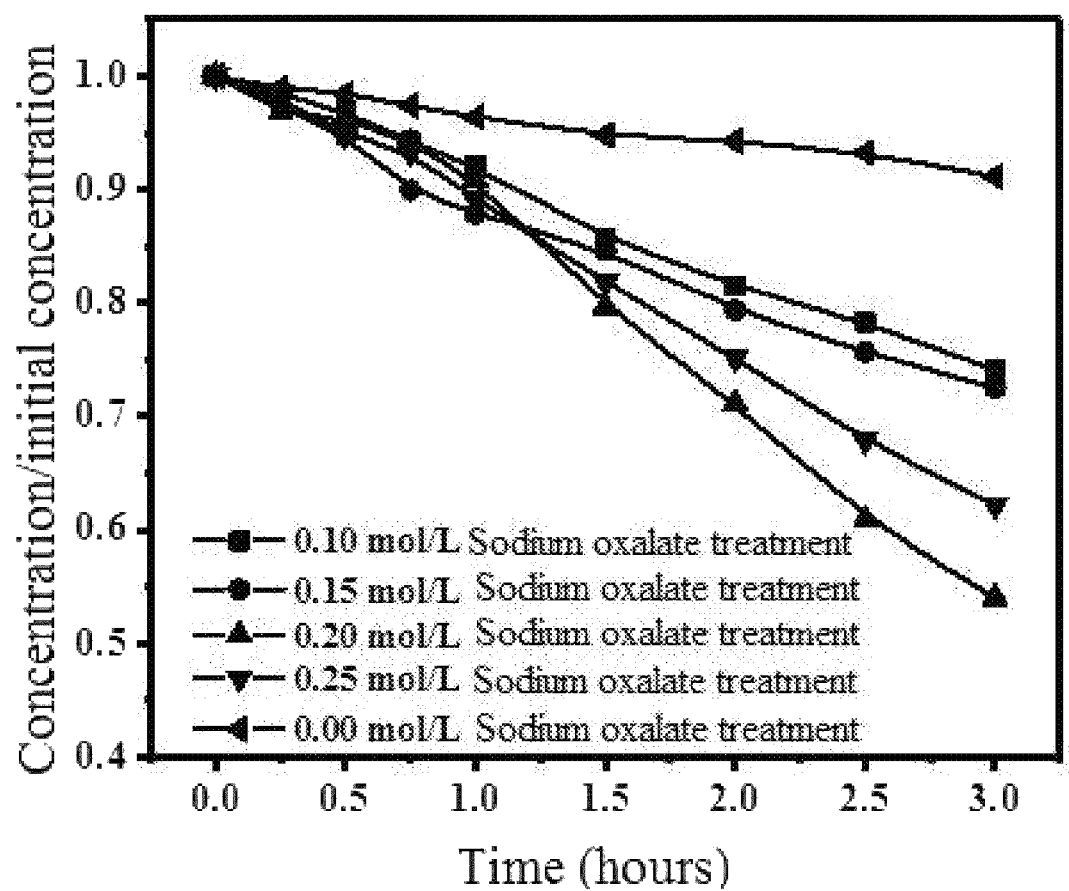
FIG. 6 is a diagram showing the effects of different concentrations of sodium oxalate-modified zero-valent iron in treating hexavalent chromium in polluted water bodies in the example 2 of the present invention.

Example 2 Effects of Different Concentrations of Sodium Oxalate-Modified Zero-Valent Iron in Treating Hexavalent Chromium in Polluted Water Bodies 4 g of zero-valent iron is weighed, the weighed zero-valent iron is respectively soaked in 0 mol/L, 0.10 mol/L, 0.15 mol/L, 0.20 mol/L and 0.25 mol/L of sodium oxalate solutions for 2 h, filtering and washing are conducted, and the treated zero-valent iron is dried under the protection of inert gas. 50 mL of a 2 mg/L hexavalent chromium aqueous solution is used as simulated wastewater, 0.10 g of the sodium oxalate-modified zero-valent iron is added to the hexavalent chromium aqueous solution, the hexavalent chromium aqueous solution containing the sodium oxalate-modified zero-valent iron is put in a shaker at constant temperature of 25° C. and a rotating speed of 200 rpm/min, timing sampling is conducted, and a spectrophotometry is used to measure the hexavalent chromium concentration. At the same time, the untreated zero-valent iron is used as a control test and the results are shown in FIG. 6. As shown in the FIG. 6, after 3 h of the reaction, a removal rate of the hexavalent chromium in the modified zero-valent iron system is higher than that in the unmodified system, and the effect of 0.20 mol/L of the sodium oxalate-modified zero-valent iron is the best.

Figure 7:
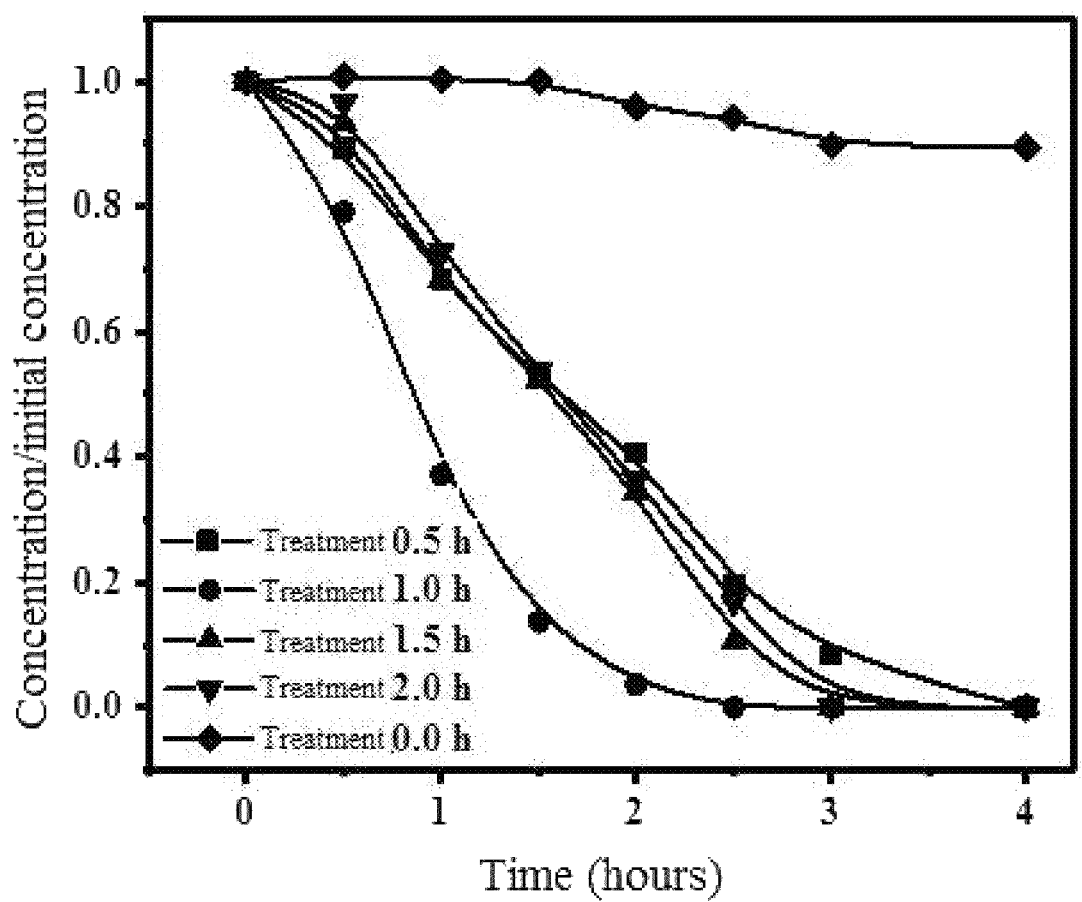
FIG. 7 is a diagram showing the effects of sodium oxalate-modified zero-valent iron in treating hexavalent chromium in polluted water bodies in different treatment time in the example 3 of the present invention.

Example 3 Effects of Sodium Oxalate-Modified Zero-Valent Iron in Treating Hexavalent Chromium in Polluted Water Bodies in Different Treatment Time 4 g of zero-valent iron is weighed, the weighed zero-valent iron is respectively soaked with a 0.20 mol/L sodium oxalate solution for 0 h, 0.5 h, 1.0 h, 1.5 h and 2 h, filtering and washing are conducted, and the treated zero-valent iron is dried under the protection of inert gas. 50 mL of a 2 mg/L hexavalent chromium aqueous solution is used as simulated wastewater, 0.25 g of the sodium oxalate-modified zero-valent iron is added to the hexavalent chromium aqueous solution, the hexavalent chromium aqueous solution containing the sodium oxalate-modified zero-valent iron is put in a shaker at constant temperature of 25° C. and a rotating speed of 200 rpm/min, timing sampling is conducted, and a spectrophotometry is used to measure the hexavalent chromium concentration. At the same time, the untreated zero-valent iron is used as a control test and the results are shown in FIG. 7. As shown in the FIG. 7, after 3 h of the reaction, a removal rate of the hexavalent chromium in the modified zero-valent iron system is higher than that in the unmodified system, and the effect of the zero-valent at the treatment time of 1 h is the best.

Figure 8:
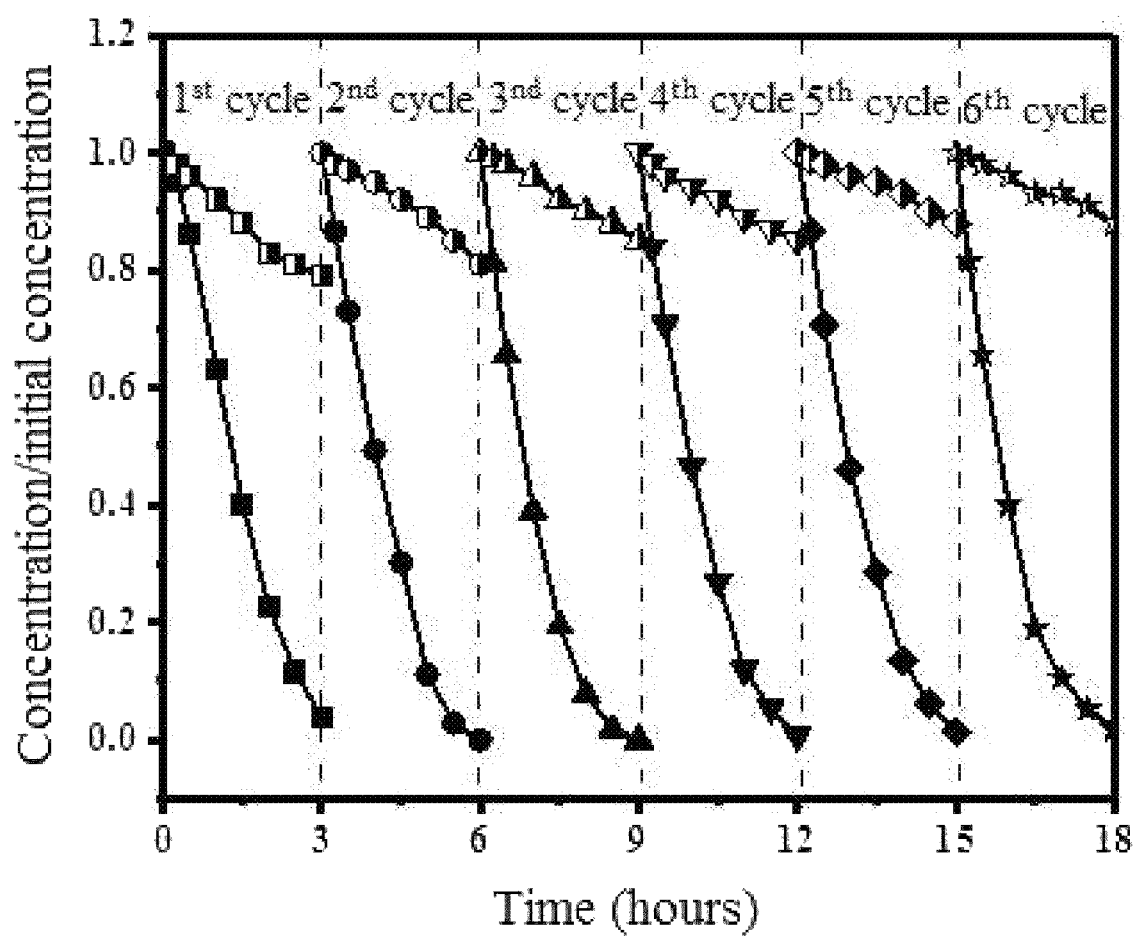
FIG. 8 is a diagram showing the effect of cycling performance in reducing the hexavalent chromium in the example 4 of the present invention, wherein solid points are sodium oxalate-modified zero-valent iron and semi-solid points are unmodified zero-valent iron.

Example 4 Cyclic Effects of Sodium Oxalate-Modified Zero-Valent Iron in Reducing Hexavalent Chromium 50 mL of a 2 mg/L hexavalent chromium aqueous solution is used as simulated wastewater, 0.25 g of sodium oxalate-modified zero-valent iron prepared according to the method of the example 1 and 0.25 g of unmodified zero-valent iron are respectively added to the hexavalent chromium aqueous solution, the hexavalent chromium aqueous solution containing the sodium oxalate-modified zero-valent iron or the unmodified zero-valent iron is put in a shaker at constant temperature of 25° C. and a rotating speed of 200 rpm/min, timing sampling is conducted, and a spectrophotometry is used to measure the hexavalent chromium concentration. After all the hexavalent chromium in the system is removed, the added zero-valent iron is recovered, after washing and drying, then the zero-valent is added to 50 mL of the 2 mg/L hexavalent chromium aqueous solution, removal of the hexavalent chromium is continuously measured, and a cycle is counted when the above steps are completed. The results of the cyclic reactions are shown in FIG. 8. As shown in the FIG. 8 (solid points are sodium oxalate-modified zero-valent iron and semi-solid points are unmodified zero-valent iron), when the 6$^{th}$ cycle is conducted, the sodium oxalate-modified zero-valent iron system can still effectively remove the hexavalent chromium, while the unmodified zero-valent iron is not high in cyclic activity.

Figure 9:
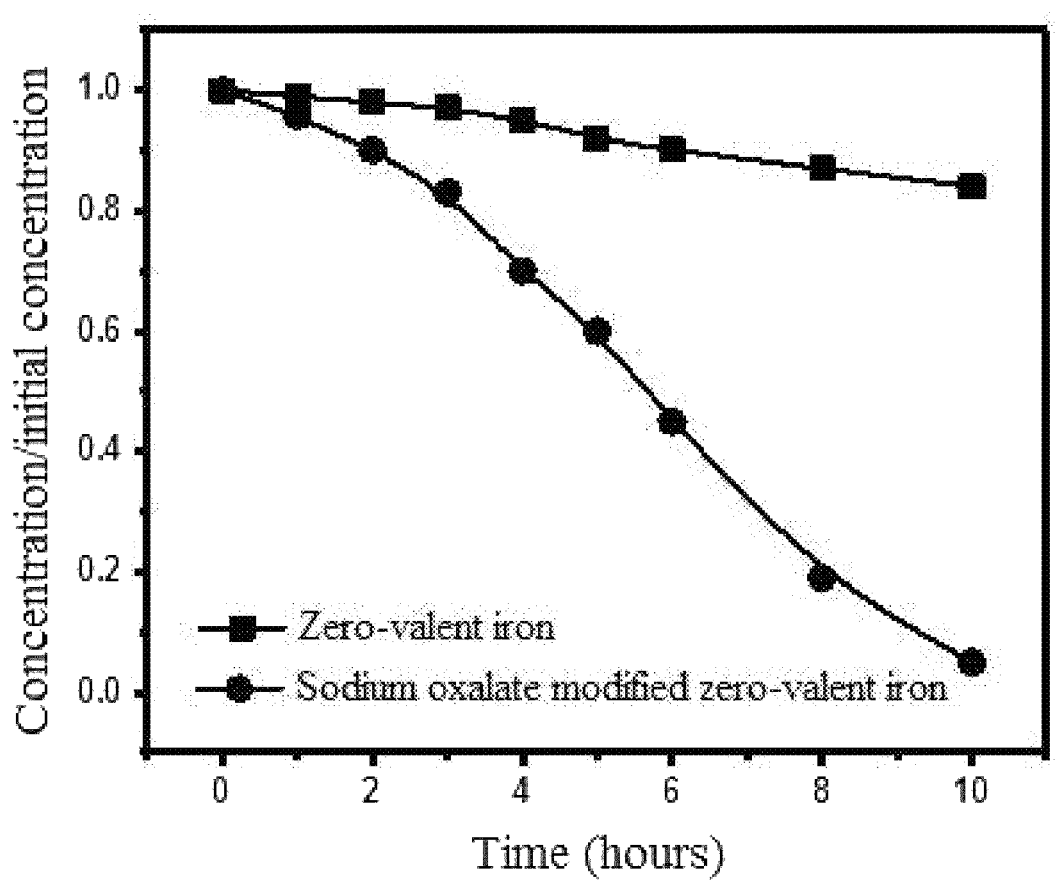
FIG. 9 is a diagram showing the effect of sodium oxalate-modified zero-valent iron in treating relatively high concentration of hexavalent chromium in polluted water bodies in the method of the present invention.

Example 5 Effects of Sodium Oxalate-Modified Zero-Valent Iron in Treating Relatively High Concentration of Hexavalent Chromium in Polluted Water Bodies 50 mL of a 10 mg/L hexavalent chromium aqueous solution is used as simulated wastewater, 0.25 g of sodium oxalate-modified zero-valent iron prepared by the method of the example 1 and 0.25 g of unmodified zero-valent iron are respectively added to the hexavalent chromium aqueous solution, the hexavalent chromium aqueous solution containing the sodium oxalate-modified zero-valent iron or the unmodified zero-valent iron is put in a shaker at constant temperature of 25° C. and a rotating speed of 200 rpm/min, timing sampling is conducted, and a spectrophotometry is used to measure the hexavalent chromium concentration. The results are shown in FIG. 9. As shown in the FIG. 9, after 10 h of the reaction, a removal rate of the hexavalent chromium in a system containing the sodium oxalate-modified zero-valent iron reaches 99.5%, while the removal rate of the hexavalent chromium in a system containing the unmodified zero-valent iron is 15%. The results show that the sodium oxalate-modified zero-valent iron also has a significant promoting effect of removing the high concentration of the hexavalent chromium in the solution.

The zero-valent iron of the above examples is the micron-sized zero-valent iron having a particle diameter of about 90-120 μm.

The foregoing description of the exemplary embodiments of the invention has been presented only for the purposes of illustration and description and is not intended to be exhaustive or to limit the invention to the precise forms disclosed. Many modifications and variations are possible in light of the above teaching.

While there has been shown several and alternate embodiments of the present invention, it is to be understood that certain changes can be made as would be known to one skilled in the art without departing from the underlying scope of the invention as is discussed and set forth above and below including claims and drawings. Furthermore, the embodiments described above are only intended to illustrate the principles of the present invention and are not intended to limit the scope of the invention to the disclosed elements.

What is claimed is:

1. A method for removing hexavalent chromium from water bodies by sodium oxalate-modified zero-valent iron, comprising the steps of: soaking zero-valent iron in a sodium oxalate solution for a period of time; and washing and drying to obtain the sodium oxalate-modified zero-valent iron; and then treating water bodies with the sodium oxalate-modified zero-valent iron to remove the heavy metal pollutant hexavalent chromium from the water bodies.

2. The method of claim 1, wherein the sodium oxalate solution has a concentration of between 0.05 and 0.25 mol/L.

3. The method of claim 1, wherein the sodium oxalate solution has a concentration of between 0.1 and 0.2 mol/L.

4. The method of claim 1, wherein the soaking time is between 0.5 and 2.0 h.

5. The method of claim 1, wherein the soaking time is 1-2 h.

6. The method of claim 1, wherein the zero-valent iron is micron-sized zero-valent iron.

7. The method of claim 1, wherein the drying is vacuum drying, drying under an inert atmosphere or freeze drying.

8. The method of claim 1, wherein the hexavalent chromium in the hexavalent chromium polluted water bodies has a concentration of between 0.1 and 100 mg/L.

9. The method of claim 1, wherein the use amount of the sodium oxalate-modified zero-valent iron is 1 g/L-10 g/L.

10. The method of claim 1, wherein shaker shaking or mechanical stirring is performed during treating the water bodies with the sodium oxalate-modified zero-valent iron to remove the heavy metal pollutant hexavalent chromium from the water bodies.

* * * * *